(12) United States Patent
Zhu

(10) Patent No.: US 8,979,003 B2
(45) Date of Patent: Mar. 17, 2015

(54) FILTRATION IRRIGATION DEVICE

(76) Inventor: Jun Zhu, Beijing (CN)

( * ) Notice: Subject to any disclaimer, the term of this patent is extended or adjusted under 35 U.S.C. 154(b) by 278 days.

(21) Appl. No.: 13/498,476

(22) PCT Filed: Sep. 29, 2009

(86) PCT No.: PCT/CN2009/074304
§ 371 (c)(1),
(2), (4) Date: Mar. 27, 2012

(87) PCT Pub. No.: WO2011/038538
PCT Pub. Date: Apr. 7, 2011

(65) Prior Publication Data
US 2012/0181357 A1    Jul. 19, 2012

(51) Int. Cl.
*B05B 15/00*    (2006.01)
*A01G 25/02*    (2006.01)

(52) U.S. Cl.
CPC .............. *A01G 25/02* (2013.01); *B05B 15/008* (2013.01)
USPC ........... 239/547; 239/145; 239/542; 239/575; 239/590.3; 405/45

(58) Field of Classification Search
USPC .............. 239/145, 542, 547, 575, 590, 590.3; 405/45, 51
See application file for complete search history.

(56) References Cited

U.S. PATENT DOCUMENTS

| | | | |
|---|---|---|---|
| 2,769,668 A * | 11/1956 | Richards | 239/145 |
| 2,798,768 A * | 7/1957 | Babin | 239/145 |
| 3,799,442 A | 3/1974 | Delmer | |
| 3,901,448 A * | 8/1975 | Babin | 239/145 |
| 4,254,791 A | 3/1981 | Bron | |
| 5,996,909 A * | 12/1999 | Lin | 239/542 |
| 2004/0222321 A1 | 11/2004 | Golan et al. | |

FOREIGN PATENT DOCUMENTS

| | | |
|---|---|---|
| BE | 892617 A1 | 9/1982 |
| CN | 2149098 Y | 12/1993 |
| CN | 1802089 A | 7/2006 |
| FR | 2618049 A1 | 1/1989 |
| JP | 5-95737 A | 4/1993 |
| JP | 05123065 A | 5/1993 |
| JP | 2005525806 A | 9/2005 |
| JP | 2006034151 A | 2/2006 |
| JP | 2009-201401 A | 9/2009 |
| JP | 2012-5369 A | 1/2012 |

(Continued)

OTHER PUBLICATIONS

International Search Report for International Application No. PCT/CN2009/074304, mailed Jul. 8, 2010, with English translation.
Colombian First Office Action for International Application No. PCT/CN2009/074304; Date of Mailing: May 3, 2013, with English Translation.

(Continued)

*Primary Examiner* — Steven J Ganey
(74) *Attorney, Agent, or Firm* — Cantor Colburn LLP

(57) ABSTRACT

A filtration irrigation method, filtration irrigation device and the manufacturing method thereof, said filtration irrigation device comprises a water carrying chamber, in which one or more porous filter membranes are arranged. One or more flow restrictors corresponding to each membrane are set on the wall of the water carrying chamber. The total permeation capacity of the flow restrictors is less than that of said filter membranes. The present invention can avoid the blockage of the device effectively.

18 Claims, 6 Drawing Sheets

(56) References Cited

FOREIGN PATENT DOCUMENTS

| | | |
|---|---|---|
| KR | 1020110114438 A | 10/2011 |
| WO | 2006000048 A1 | 1/2006 |
| WO | 2007/073614 A1 | 7/2007 |
| WO | 2009/121306 A1 | 10/2009 |

OTHER PUBLICATIONS

Extended European Search Report for Application No. 09849946.0-1655; Date of Mailing: May 6, 2013.

Notice of Allowance of Patent for Korean Application No. 10-2012-7011079, delivery date Mar. 24, 2014, with English translation.

* cited by examiner

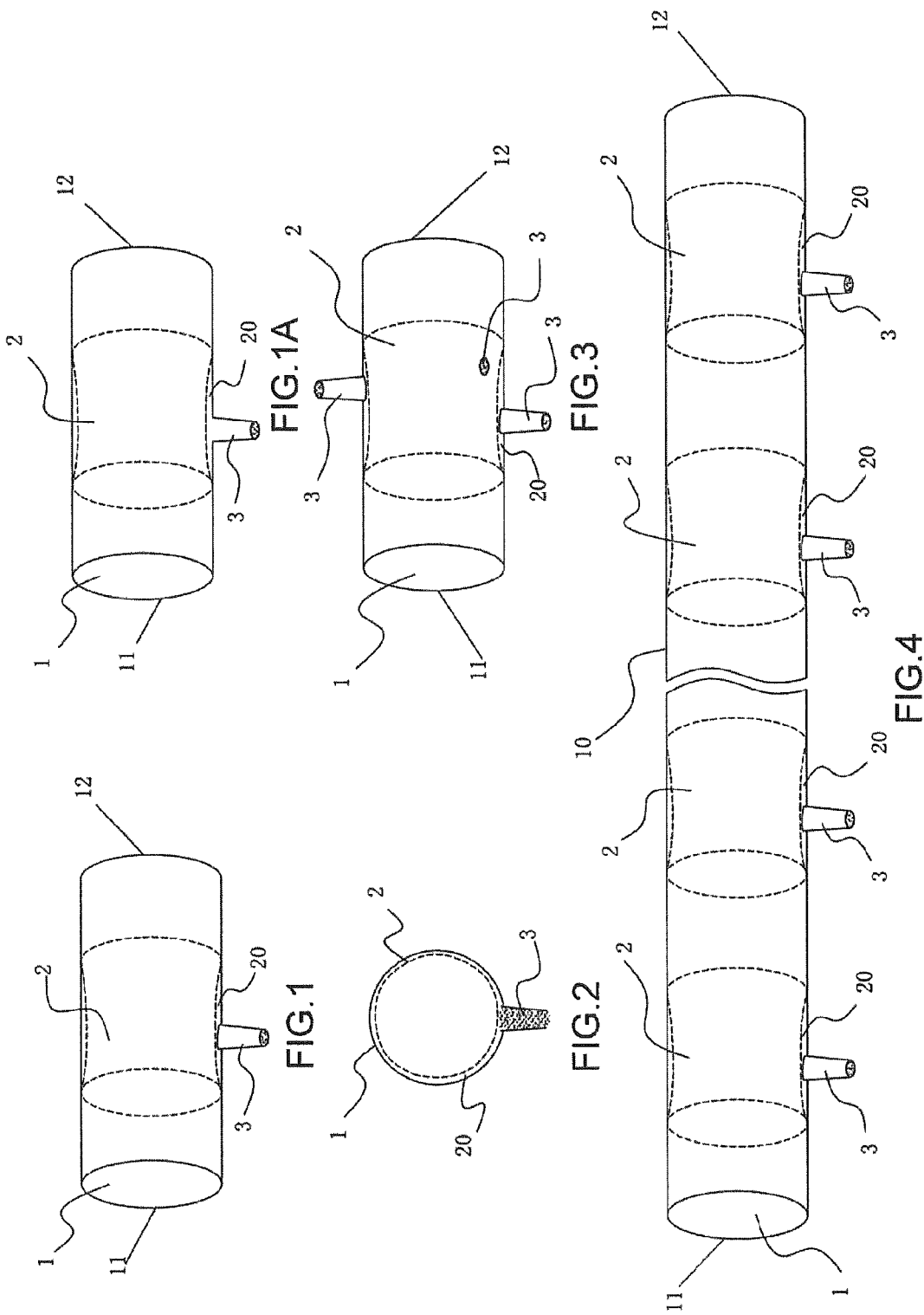

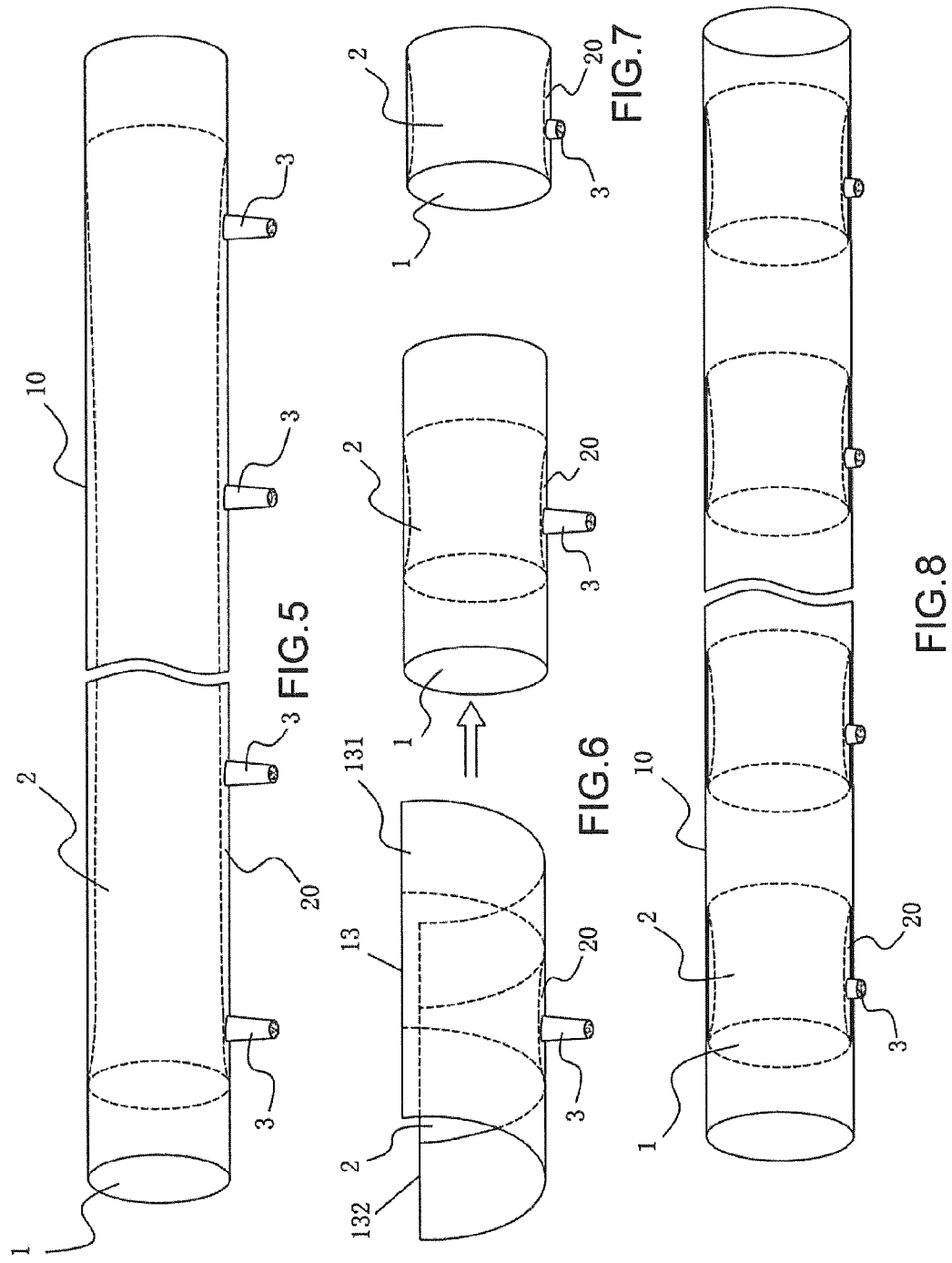

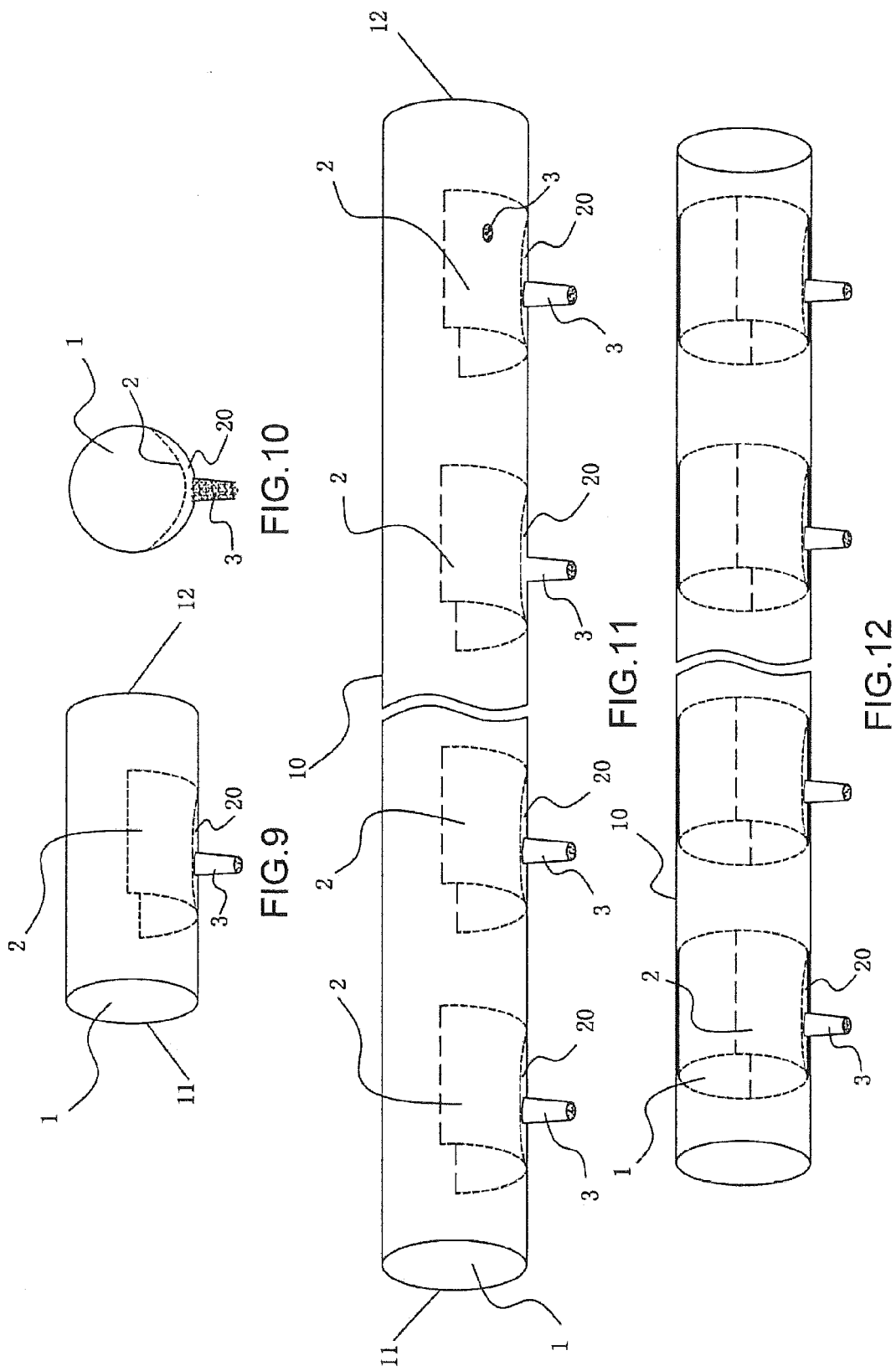

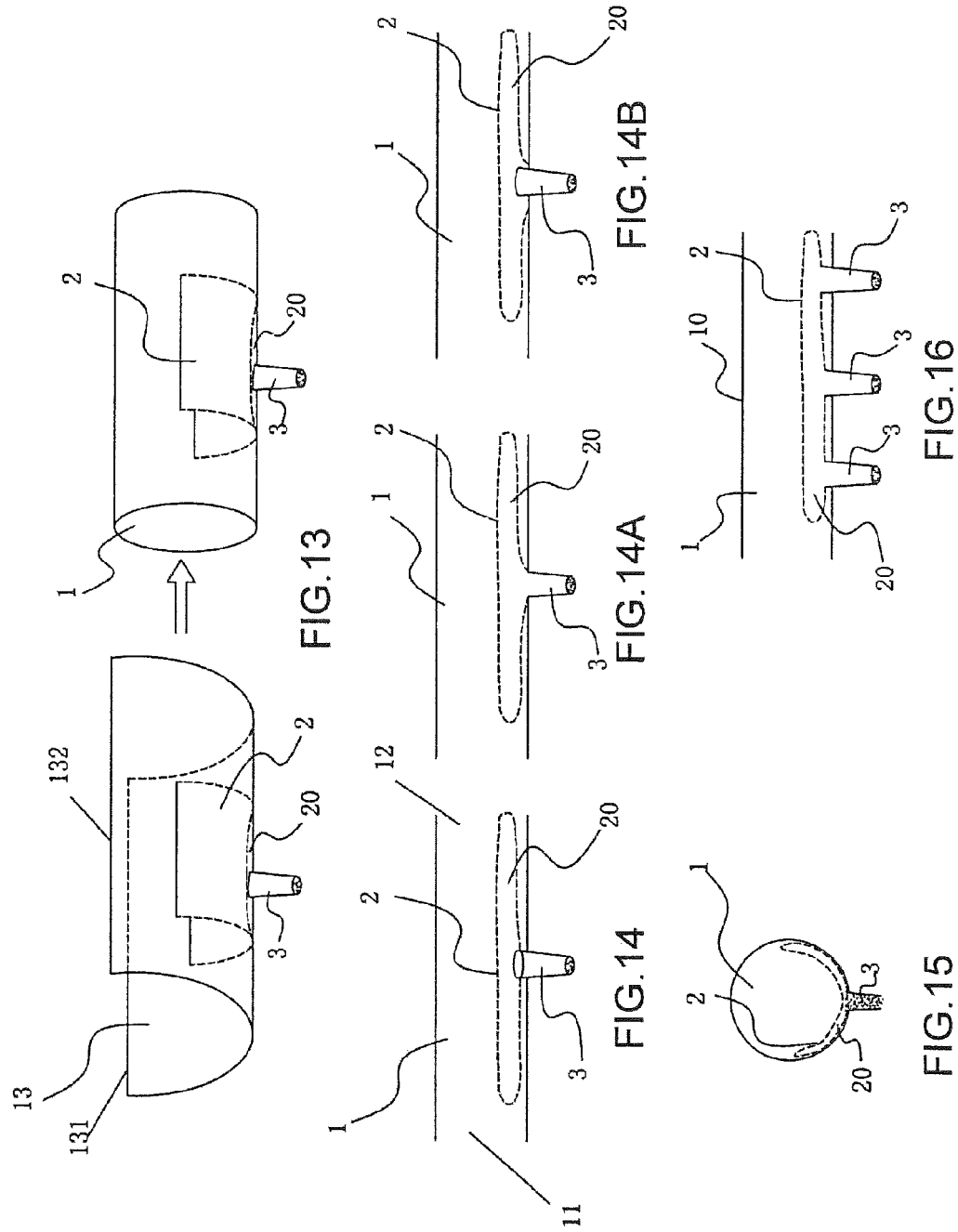

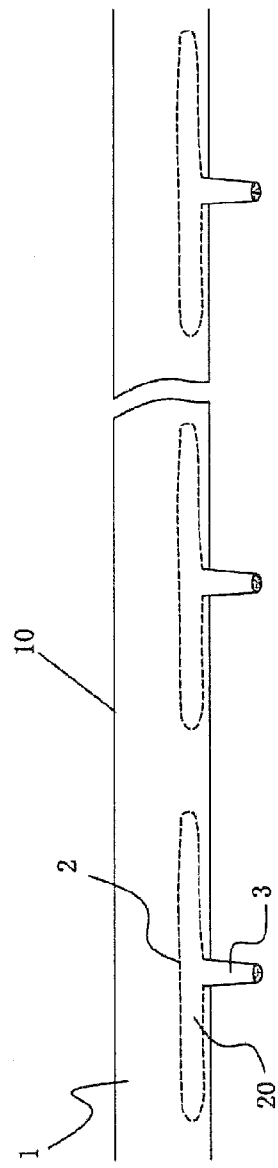
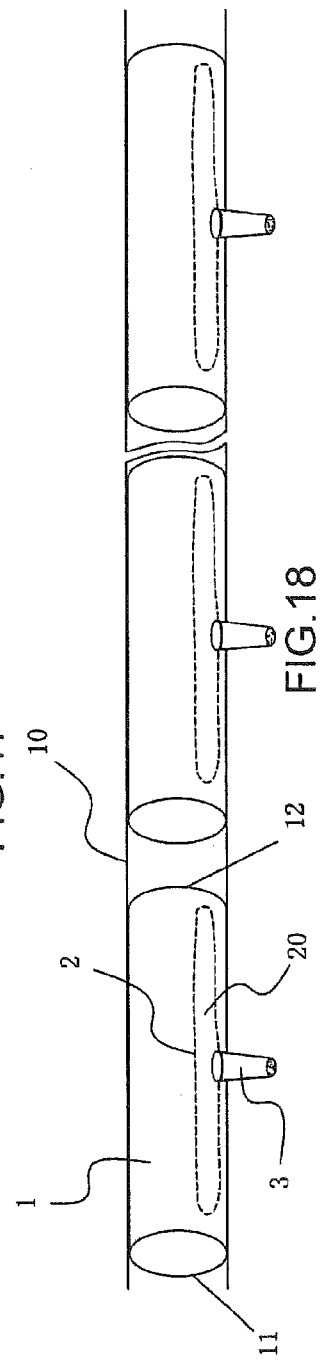
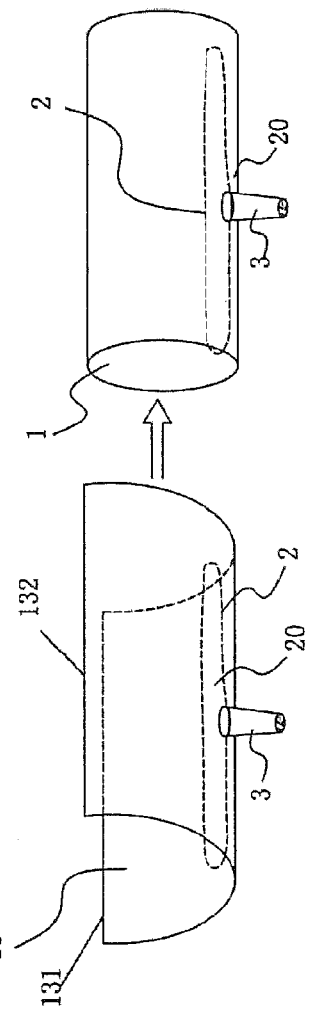
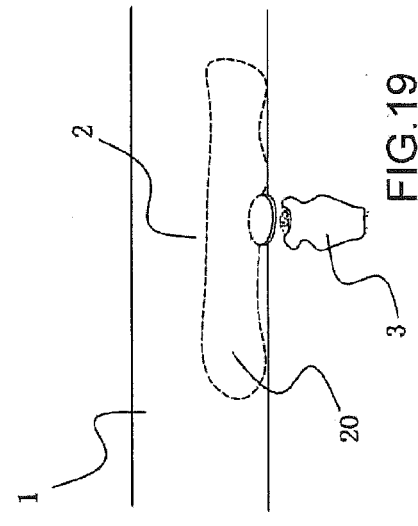

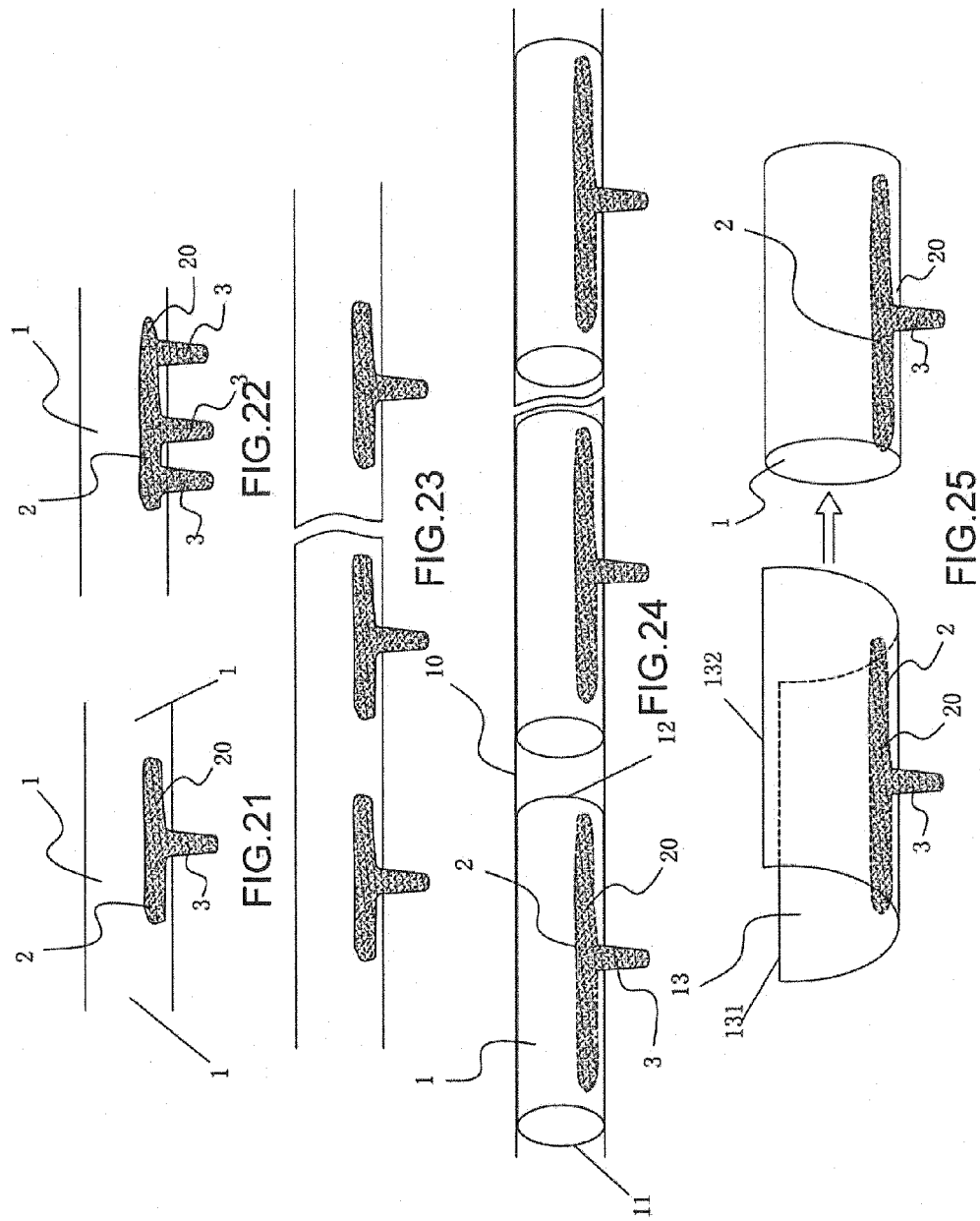

FILTRATION IRRIGATION DEVICE

CROSS REFERENCE TO RELATED APPLICATIONS

This is a U.S. national stage of application No. PCT/CN2009/074304, filed on 29 Sep. 2009.

FIELD OF THE INVENTION

The present invention relates to a micro-irrigation technique for irrigating plants, and particularly, to an infiltration irrigation method, an infiltration irrigation apparatus and a method for manufacturing the same.

BACKGROUND OF THE INVENTION

In the drip irrigation and the infiltration irrigation at present, a most important problem is the blockage of the water outflow pores of the irrigator. In order to prevent the blockage, a common method is to perform a water treatment at the water supply end of the irrigation pipeline. However, this requires a very large investment on equipments, and the whole pipeline may be discarded due to any improper water treatment.

A diameter of the drip irrigation water outflow pore is generally between 0.5 and 1 mm, and the diameter of the infiltration irrigation water outflow pore is mainly from tens of microns to more than one hundred microns. It is found upon research that the blockage is caused by many impurities of different diameters within the above pore diameter ranges, and the particle diameter ranges from tens of microns to less than one micron. Careful studies show that the blockage process of these water outflow pores is as follows. The water in the pipe flows in an axial direction under pressure, wherein some water flows out in a radial direction through the water outflow pores, i.e., becomes irrigation water. Particles carried in the water with small diameters or diameters close to those of the water outflow pores form a bridge and block the outflow passage due to quick impact and drive by the water flowing by the water outflow pores. Thus smaller pores are remained near the bridge, while these pores will be further occupied by other particles or smaller particle bridges, and then are gradually blocked.

For this reason, it is necessary to provide an infiltration irrigation apparatus to solve or improve the problem of the blockage of the water outflow pores in the current drip irrigation and infiltration irrigation.

SUMMARY OF THE INVENTION

An object of the present invention is to provide an infiltration irrigation method, an infiltration irrigation apparatus and a method for manufacturing the same, which are capable of automatically clearing the obstructions by sufficiently utilizing the water flow to improve or prevent the blockage of the infiltration irrigation apparatus, prolong the service life of the infiltration irrigation apparatus, and reduce the use cost.

After repeated tests and studies of the water in the pipe, the inventor finds that when the diameter of the infiltration irrigation water outflow pore is small enough and the water outflow rate is sufficiently low, the impurities are difficult to block the outflow passage. Instead, they are slightly attached to the surfaces of the outflow pores, and then can be easily cleared by a shearing force generated by parallel water stream in the pipe. An anti-blockage and water-saving infiltration irrigation apparatus then can be manufactured by sufficiently utilizing such characteristic. The whole irrigation system adopting the infiltration irrigation apparatus can completely perform an automatic cleaning just using the water stream inside the irrigation pipeline, without needing any water treatment device, and will not be blocked during a long-term usage.

On the basis of the above principle, the present invention provides an infiltration irrigation apparatus including:

a water passing chamber having a water outlet and a water inlet, wherein a water stream along an axial direction of the water passing chamber is formed when the water flows between the water inlet and the water outlet;

one or more porous filter membranes disposed in the water passing chamber and formed with a filtration section for accommodating the water filtered by the one or more porous filter membranes; and the location of the one or more porous filter membrane is set so that at least a part of the water stream flows along a surface of the porous filter membrane to wash the surface when the axial water stream exists in the water passing chamber; and one or more flow restrictors each disposed on a sidewall of the water passing chamber corresponding to the porous filter membrane, wherein each of the one or more flow restrictors has one or more restricting orifices, an inlet communicated with the filtration section of the one or more porous filter membranes and an outlet outside the water passing chamber, and a total water seepage capability of the one or more flow restrictors is smaller than that of the one or more porous filter membranes.

In a preferred example of the present invention, a maximum pore diameter of a restricting orifice of the flow restrictor is larger than that of the porous filter membrane.

In an optional embodiment of the present invention, the number of the one or more porous filter membranes is one, and one or more flow restrictors are disposed in correspondence to the porous filter membrane.

In another optional embodiment of the present invention, the number of the one or more porous filter membranes is more than one, and one or more flow restrictors are disposed in correspondence to each of the porous filter membranes.

In an optional embodiment of the present invention, the porous filter membrane covers a part of an inner wall of the water passing chamber, and edges of the porous filter membrane closely engage with the inner wall of the water passing chamber, so as to form the filtration section between the porous filter membrane and the inner wall of the water passing chamber covered thereby.

In another optional embodiment of the present invention, the porous filter membrane covers a complete circumference of an inner wall of the water passing chamber, and the edges of the porous filter membrane closely engage with the inner wall of the water passing chamber, so as to form the filtration section between the porous filter membrane and the inner wall of the water passing chamber covered thereby.

In yet another optional embodiment of the present invention, the porous filter membrane is bag-shaped, and the filtration section is formed in a bag of the porous filter membrane. In an example of this embodiment, the sidewall of the water passing chamber is disposed with an opening for engaging with the flow restrictor, the flow restrictor is inserted into the opening, a housing of the flow restrictor closely engages with edges of the opening, a bag mouth of the bag-shaped porous filter membrane closely engages with the inlet of the flow restrictor, so that the inlet of the flow restrictor is communicated with the filtration section. In a preferred example of this embodiment, the porous filter membrane has a flat bag shape, and the flat bag shaped porous filter membrane is set flush in the water passing chamber.

In still another optional embodiment of the present invention, the porous filter membrane and the flow restrictor are integrally formed with a same porous material. In this embodiment, the porous material may be porous ceramics.

In the present invention, the sidewall of the water passing chamber is disposed with an opening for engaging with the flow restrictor, an inlet of the flow restrictor closely engages with the opening, so as to dispose the flow restrictor on the sidewall of the water passing chamber; or the flow restrictor is directly mounted in the opening, so as to dispose the flow restrictor on the sidewall of the tubular water passing chamber.

In an optional embodiment of the present invention, the water passing chamber may be specifically formed in a tubular shape.

In an optional embodiment of the present invention, the water passing chamber is constituted by a water pipe or a part thereof, or a tubular support enclosed in the water pipe, and when the water flows in the water pipe, some flows in an axial direction of the water pipe and passes by a surface of the porous filter membrane to wash the surface, while some is filtered by the porous filter membrane, enters the flow restrictor through the filtration section, and flows out of the outlet of the flow restrictor to form irrigation water.

In an optional embodiment of the present invention, the number of the porous filter membranes is more than one, each of the porous filter membranes is disposed in a tubular support, and a plurality of tubular supports disposed with the porous filter membranes are enclosed in the water pipe, respectively, in the axial direction of the water pipe, so that the porous filter membranes are distributed in the water pipe.

In the present invention, the water pipe may be disposed with a valve or mounted with a micro pump actuated periodically, so that the water in the pipe moves to clear the impurities on the surface of the porous filter membrane.

In the present invention, the total water seepage capability of the porous filter membrane may be equal to or greater than five times of that of the corresponding one or more flow restrictors.

In the present invention, a maximum pore diameter of the restricting orifice may be equal to or greater than five times of that of the porous filter membrane.

The present invention further provides an infiltration irrigation method that uses the above infiltration irrigation apparatus, wherein one or more porous filter membranes are installed in a water passing chamber, and a filtration section is formed to accommodate the water filtered by the porous filter membrane; a sidewall of the water passing chamber corresponding to the location of each of the porous filter membranes is disposed with one or more flow restrictors, each of the flow restrictors has one or more restricting orifices, an inlet communicated with the filtration section of the porous filter membrane and an outlet outside the water passing chamber, and a total water seepage capability of the one or more flow restrictors is smaller than that of the one or more porous filter membranes; the water in the water passing chamber is made to flow axially at regular time so that an axial water stream flows along a surface of the porous filter membrane to wash the surface.

The present invention further provides a method for manufacturing the above infiltration irrigation apparatus, including:

A. providing one or more flow restrictors and one or more porous filter membranes, wherein each of the flow restrictors has one or more restricting orifices, and a total water seepage capability of the one or more flow restrictors is smaller than that of the one or more porous filter membranes;

B. correspondingly disposing the porous filter membrane and the flow restrictor on a plastic sheet having first and second longitudinal edges, wherein the porous filter membrane is located at an inner side of the plastic sheet and the flow restrictor is located at an outer side of the plastic sheet; a filtration section for accommodating the water filtered by the porous filter membrane is formed at a side where the porous filter membrane is located; and an inlet of the flow restrictor is communicated with the filtration section; and C. engaging the first and second longitudinal edges of the plastic sheet with each other to form a tubular shape.

The present invention further provides a method for manufacturing the above infiltration irrigation apparatus, including:

A. providing one or more flow restrictors, one or more porous filter membranes, and a water passing chamber composed of a tubular support, wherein each of the flow restrictors has one or more restricting orifices, and a total water seepage capability of the one or more flow restrictors is smaller than that of the one or more porous filter membranes;

B. correspondingly disposing the porous filter membrane and the flow restrictor on the tubular support, wherein the porous filter membrane is located in a pipe of the tubular support; a filtration section for accommodating the water filtered by the porous filter membrane is formed; the flow restrictor is mounted on a sidewall of the tubular support in correspondence to the porous filter membrane; and an inlet of the flow restrictor is communicated with the filtration section of the porous filter membrane;

C. putting the tubular support having the porous filter membrane and the flow restrictor into a molding machine head during an extrusion molding of a water pipe, so that the tubular support is wrapped in the water pipe after the water pipe is extruded by the molding machine head; and D. making a cut at a location corresponding to the outlet of the flow restrictor on the sidewall of the water pipe, so as to expose the outlet of the flow restrictor.

When the infiltration irrigation apparatus and the infiltration irrigation method of the present invention are adopted, since the total water seepage capability of the one or more flow restrictors is smaller than that of the one or more porous filter membranes, the total water outflow of the one or more flow restrictors is smaller than that of the one or more porous filter membranes, which reduces the amount of water penetrating the one or more porous filter membrane. Therefore, the water penetration rate of the porous filter membrane is reduced, and the impact speed of the impurities carried in the water on the porous filter membrane is decreased, so that the impurities are attached to the surface of the porous filter membrane very slightly. In addition, as the porous filter membrane is disposed in the water passing chamber, the surface of the porous filter membrane can be washed through the axial water stream in the water passing chamber, so that the impurities attached to the surface of the porous filter membrane very slightly are washed away by the water stream flowing along the surface of the porous filter membrane, which improves or avoids the blockage of the porous filter membrane, and effectively improves the blockage of the infiltration irrigation apparatus. Further, since the maximum pore diameter of the restricting orifice of the flow restrictor is preferably larger than that of the porous filter membrane, the restricting orifice will not be blocked when the water filtered by the porous filter membrane flows by the restricting orifice. Therefore, the infiltration irrigation apparatus of the present invention is very difficult to be blocked during the usage, and the service life of an infiltration irrigation system using such infiltration irrigation apparatus is far prolonged as compared with the case of adopting the infiltration irrigation apparatus of the prior art, which greatly reduces the use cost.

During the production of the infiltration irrigation apparatus of the present invention, the porous filter membrane and the flow restrictor may be directly engaged with the plastic sheet at first, and then the two longitudinal edges of the plastic sheet are engaged (by hot melting or gluing) with each other to form the plastic sheet into a tubular shape, which facilitates the continuous production of the tubular infiltration irrigation apparatus.

BRIEF DESCRIPTION OF THE DRAWINGS

In order to more clearly describe the technical solutions in the embodiments of the present invention or the prior art, the drawings needed for the descriptions of the embodiments or the prior art are briefly introduced as follows. It is obvious that the following drawings are just some embodiments of the present invention, and a person skilled in the art can acquire other drawings based on these drawings without paying any creative effort. Furthermore, these drawings are just exemplary, and do not limit the scales of various parts in the drawings.

FIG. 1 is a structural diagram of Embodiment 1 of the present invention;

FIG. 1A is another structural diagram of Embodiment 1 of the present invention;

FIG. 2 is a sectional diagram of FIG. 1 of the present invention;

FIG. 3 is a structural diagram of Embodiment 1 of the present invention in which one porous filter membrane is corresponding to a plurality of flow restrictors;

FIG. 4 is a structural diagram of Embodiment 1 of the present invention in which a plurality of porous filter membranes are disposed in a water passing chamber;

FIG. 5 is a structural diagram of Embodiment 1 of the present invention in which an entire porous filter membrane is disposed in an axial direction in the water passing chamber;

FIG. 6 is a schematic diagram of a manufacturing process of Embodiment 1 of the present invention;

FIG. 7 is a structural diagram of Embodiment 1 of the present invention in which the water passing chamber is a tubular support;

FIG. 8 is a schematic diagram of Embodiment 1 of the present invention in which an infiltration irrigation apparatus as illustrated in FIG. 7 is mounted into a water pipe or a part thereof;

FIG. 9 is a structural diagram of Embodiment 2 of the present invention;

FIG. 10 is a sectional diagram of FIG. 9 of the present invention;

FIG. 11 is a structural diagram of Embodiment 2 of the present invention in which a plurality of porous filter membranes are disposed in a water passing chamber;

FIG. 12 is a structural diagram of Embodiment 2 of the present invention in which an entire porous filter membrane is disposed in an axial direction in the water passing chamber;

FIG. 13 is a schematic diagram of a manufacturing process of Embodiment 2 of the present invention;

FIG. 14 is a structural diagram of Embodiment 3 of the present invention;

FIG. 14A is another structural diagram of Embodiment 3 of the present invention;

FIG. 14B is yet another structural diagram of Embodiment 3 of the present invention;

FIG. 15 is a sectional diagram of FIG. 14 of the present invention;

FIG. 16 is a structural diagram of Embodiment 3 of the present invention in which one porous filter membrane is corresponding to a plurality of flow restrictors;

FIG. 17 is a structural diagram of Embodiment 3 of the present invention in which a plurality of porous filter membranes are disposed in a water passing chamber;

FIG. 18 is a schematic diagram of Embodiment 3 of the present invention in which an infiltration irrigation apparatus using a tubular support as a water passing chamber is mounted into a water pipe or a part thereof;

FIG. 19 is schematic diagram of a mounting structure of Embodiment 3 of the present invention;

FIG. 20 is a schematic diagram of a manufacturing process of Embodiment 3 of the present invention;

FIG. 21 is a structural diagram of Embodiment 4 of the present invention;

FIG. 22 is a structural diagram of Embodiment 4 of the present invention in which one porous filter membrane is corresponding to a plurality of flow restrictors;

FIG. 23 is a structural diagram of Embodiment 4 of the present invention in which a plurality of porous filter membranes are disposed in a water passing chamber;

FIG. 24 is schematic diagram of Embodiment 4 of the present invention in which an infiltration irrigation apparatus using a tubular support as a water passing chamber is mounted into a water pipe or a part thereof; and FIG. 25 is a schematic diagram of a manufacturing process of Embodiment 4 of the present invention.

DETAILED DESCRIPTION OF THE PREFERRED EMBODIMENTS

Other features, advantages and embodiments of the present invention will be illustrated or explained in the following descriptions, drawings and claims. In addition, it shall be appreciated that the above summary and the following descriptions are just exemplary, and they intend to provide further explanations, instead of limiting the scope of the present invention.

Through a large number of tests, the inventor finds that whether the water stream in a pipe can burst through impurity particles blocked in the water outflow passage depends on the adhesive force of the impurities on the water outflow passage. Meanwhile, the adhesive force of the impurities on the water outflow passage is directly influenced by the particle size and the "impact speed" of the impurities blocked on the water outflow pore when the impurities is carried by a radial water stream to the water outflow pore. That is, the faster the "impact speed" is, the deeper the location of the impurities blocked in the water outflow passage is, the larger the adhesive force is, and the impurities are not easy to be burst through by an axial parallel water stream. On the contrary, if the location of the impurities blocked in the water outflow passage is shallow, the adhesive force is small, and the impurities are easy to be burst through by a transverse water stream. Since the particle sizes of the impurities determine the "impact speed" of the impurities during the settlement in the water, the relation between the particle size and the settling speed is described as follow by taking the sediment particles as an example: the coarse sand with a particle diameter of 1 mm sinks at 1 m/s in the water, the fine sand with a particle diameter of 0.1 mm sinks at 8 mm/s, the fine soil with a particle diameter of 10 microns sinks at 0.154 mm/s, and the fine clay with a particle diameter of 1 micron sinks at 0.00154 mm/s The specific gravity of the clay particle is the same as that of the coarse sediment, and the great difference in settling speed is caused by the Brownian motion. The smaller the particle diameter of the impurities in the water is, the stronger the Brownian motion is. Thus, under the influence of the Brownian motion, the smaller impurities have a lower adhesive force on the water outflow pore. Such impurities will be displaced for a large distance even by a very slight water oscillation, and can be easily cleared by the water stream in the pipe.

On the other hand, even the porous filter membrane is not easy to be blocked due to the tiny particles of impurities are influenced by the Brownian motion, the blockage possibility may be greatly increased when the water penetrating the pores has a high water outflow rate, because the flow rate of the tiny particles carried in the water stream will also be increased.

Based on the above influence factors, the present invention provides an infiltration irrigation apparatus. As illustrated in FIGS. 1 to 25, the infiltration irrigation apparatus of the present invention includes a water passing chamber 1, one or more porous filter membranes 2, and one or more flow restrictors 3. In which, the water passing chamber 1 has a water inlet 11 and a water outlet 12, and when the water flows between the water inlet 11 and the water outlet 12, a water stream along an axial direction of the water passing chamber 1 will be formed in the water passing chamber 1. The one or more porous filter membranes 2 are disposed in the water passing chamber 1 and formed with a filtration section 20 for accommodating the water filtered by the porous filter membrane 2. The location of the porous filter membrane 2 is set so that when an axial water stream exists in the water passing chamber 1, at least a part of the water stream flows along a surface of the porous filter membrane 2 to wash the surface. Each of the flow restrictors 3 is disposed on a sidewall of the water passing chamber 1 corresponding to the porous filter membrane 2. Each of the flow restrictors 3 has one or more restricting orifices, an inlet communicated with the filtration section 20 of the porous filter membrane 2 and an outlet outside the water passing chamber 1, and a total water seepage capability of the one or more flow restrictors 3 is smaller than that of the one or more porous filter membranes 2.

The present invention further provides an infiltration irrigation method based on the above infiltration irrigation apparatus. In which, one or more porous filter membranes 2 are installed in a water passing chamber 1 and formed with a filtration section 20 for accommodating the water filtered by the porous filter membrane 2. One or more flow restrictors 3 are disposed on a sidewall of the water passing chamber 1 corresponding to the location of each of the porous filter membranes 2. Each of the flow restrictors 3 has one or more restricting orifices, an inlet communicated with the filtration section 20 of the porous filter membrane 2 and an outlet outside the water passing chamber 1, and a total water seepage capability of the one or more flow restrictors 3 is smaller than that of the one or more porous filter membrane 2. The water in the water passing chamber 1 is made to flow axially at regular time so that the axial water stream flows along a surface of the porous filter membrane 2 to wash the surface.

Thus, when an infiltration irrigation is carried out, the water is firstly filtered by the porous filter membrane 2 in the water passing chamber 1 and enters the filtration section 20, then the water filtered by the filtration section 20 flows out through the flow restrictor 3. Since the total water seepage capability of the one or more flow restrictors 3 is designed to be smaller than that of the one or more porous filter membranes 2 in the present invention, the total water outflow amount of the one or more flow restrictors 3 is smaller than that of the one or more porous filter membranes 2, which reduces the amount of water penetrating the porous filter membrane 2. Therefore, the water penetration rate of the porous filter membrane 2 is reduced, and the impact speed of the impurities carried in the water stream on the porous filter membrane 2 is decreased, so that the impurities are attached to the surface of the porous filter membrane 2 very slightly. In addition, as the porous filter membrane 2 is disposed in the water passing chamber 1, the surface of the porous filter membrane 2 can be washed through the axial water stream in the water passing chamber 1, so that the impurities attached to the surface of the porous filter membrane 2 very slightly are washed away by the water stream flowing along the surface of the porous filter membrane 2, which improves or avoids a blockage of the porous filter membrane 2, and effectively improves the blockage problem of the entire infiltration irrigation apparatus.

In the present invention, a maximum pore diameter of the restricting orifice of the flow restrictor 3 is preferably set to be larger than a maximum pore diameter of the porous filter membrane 2 (it can refer to Chinese national standard GB/T 1967-1996 for the method of measuring the maximum pore diameter). Thus a control may be carried out in the aspects of water penetration diameter and water seepage rate. Since the maximum pore diameter of the restricting orifice of the flow restrictor 3 is larger than that of the porous filter membrane 2, the water filtered by the porous filter membrane 2 will not cause a blockage when flowing through the restricting orifice.

In the present invention, the maximum pore diameter may be defined as follows: a pore diameter corresponding to an intensity of pressure required for enabling the gas to pass through one end and a first bubble to occur at the other end after a porous substance is wetted by a liquid. The definitions of various pore diameters in the present invention may be acquired with reference to prior methods for measuring the pore diameter of the porous substance, and herein are not described in details.

As illustrated in FIG. 3, a plurality of flow restrictors 3 may be disposed at the water outflow side corresponding to each of the porous filter membranes 2, and each of the flow restrictors 3 has at least one restricting orifice. The total water outflow amount of these flow restrictors 3 is smaller than that of the porous filter membrane(s) 2, i.e., the total water seepage of each flow restrictor 3 is smaller than that of corresponding porous filter membrane(s) 2, and the water filtered by all the porous filter membrane(s) 2 will not flow out of the infiltration irrigation apparatus unless passing through these restricting orifices.

As mentioned above, the maximum pore diameter of the restricting orifice in the flow restrictor 3 is larger than that of the porous filter membrane 2, so that the water filtered by the porous filter membrane 2 will not cause a blockage when passing through the restricting orifice. These restricting orifices function to reduce the amount of water penetrating the porous filter membrane 2 in a certain proportion upon demand, so as to decrease the water penetration rate of the porous filter membrane 2. That is, the impact speed of the impurities carried in the water stream on the porous filter membrane 2 is decreased, so that the impurities are attached very slightly to the pores of the porous filter membrane 2 and can be easily washed away by the water stream. Such infiltration irrigation apparatus is suitable to a wide range of water supplying pressure, and the water outflow of the porous filter membrane 2 under a certain water supplying pressure may be controlled by selecting an appropriate number and appropriate pore diameters of restricting orifices. Thus the water has a sufficiently low penetration rate on the porous filter membrane 2 of a certain area where it penetrates, so as to ensure that the surface of the porous filter membrane 2 will not be blocked under the washing of the water stream of a low flow rate.

Preferably, the present invention uses a porous filter membrane 2 with the maximum pore diameter no more than 20 μm (more preferably 10 μm) as the water outflow passage for infiltration irrigation, so as to choose impurity particles having strong Brown motion characteristics to fit the pores of the porous filter membrane 2. As a result, impurity particles capable of blocking the pores of the porous filter membrane 2 are not easily to be attached to the pores of the porous filter membrane 2, and can be washed away by the water flowing along the surface of the porous filter membrane 2. The particle diameters of smaller impurities are far less than the pores of the porous filter membrane 2, and can easily pass through these pores without causing a blockage. Since large impurities will not be blocked in the membrane pores, the adhesive force is greatly reduced, and the impurities are easy to be washed away. Among even larger impurity particles there are many pores, and those impurities will not block the pores of the porous filter membrane 2 even stayed on the surface of the porous filter membrane 2.

Thus, the present invention, by determining the diameters of pores of the porous filter membrane 2, chooses out impurities having strong Brown motion characteristics as potential obstructions. In the meantime, the flow rate of water penetrating the porous filter membrane 2 is restricted by the flow restrictor 3 so as to decrease the "impact speed" of the obstruction. Under the influence of the Brown motion, the obstructions can only suspend on the surface of the porous filter membrane 2, and can be easily carried away by the water stream on the surface of the porous filter membrane 2, and the porous filter membrane 2 will nearly not be blocked by any particle. At the same time, the pore diameter of the flow restrictor 3 is larger than that of the porous filter membrane 2, thus the flow restrictor 3 also will not be blocked. Therefore, the infiltration irrigation apparatus of the present invention is difficult to be blocked, and the service life of the entire irrigation system using the infiltration irrigation apparatus is greatly prolonged.

The water passing chamber 1 in the infiltration irrigation apparatus of the present invention may be formed in a tubular shape. As illustrated in FIGS. 1, 4 and 5, the water passing chamber 1 may be constituted by a water pipe 10 or a part thereof, or may be a tubular support enclosed in the water pipe as illustrated in FIGS. 6 and 7. Thus, when water flows in the water pipe, some flows in the axial direction of the water pipe and passes by the surface of the porous filter membrane 2 to wash the surface, while some is filtered by the porous filter membrane 2, enters the flow restrictor 3 through the filtration section 20, and flows out of the outlet of the flow restrictor 3 to form irrigation water.

When the infiltration irrigation apparatus of the present invention is used, the water in the water passing chamber 1 may be enabled to flow axially at regular time, so as to periodically clear the impurities on the surface of the porous filter membrane 2 in the water passing chamber 1. The flow of water stream in the water passing chamber 1 may be implemented in various manners. For example, one end of the water pipe is provided with a valve or micro pump, and the water in the whole pipe will flow when some water is discharged by opening the valve or the water is pumped by the other end of the micro pump, so as to form an axial water stream in the water passing chamber 1. Such axial flow of the water stream in the water passing chamber 1 may effectively wash the porous filter membrane 2, so that the impurities stayed thereon will be displaced and cannot block the pores of the porous filter membrane 2, thus a long-time and stable operation of the entire irrigation system is ensured. Or, when the water pipe is an annular (circular, elliptical, rectangular or the like) structure, a micro pump may also be mounted on the pipe, so as to make the water in the pipe move periodically, and continuously clear the impurities on the porous filter membrane 2. Thus the membrane is ensured to be unobstructed and the flow restrictor 3 will not be blocked, and the entire irrigation system can operate stably in a long term.

In the present invention, the restricting orifices of the flow restrictor 2 may be formed in various manners. For example, a porous medium having a capillary function or capillary tube bundles may be disposed in the flow restrictor 2 to form a plurality of restricting orifices. Of course, the restricting orifices may also be formed in other manners known by persons skilled in the art, and herein is not limited.

During the actual operation, a manner may also be adopted in which the average or minimum pore diameter of the restricting orifice is larger than the maximum pore diameter of the porous filter membrane, which is more favorable to prevent the flow restrictor from being blocked (it can refer to Chinese national standard GB/T 1967-1996 for the method of measuring the average and minimum pore diameters).

Preferably, the maximum pore diameter of the restricting orifice 3 is chosen to be equal to or greater than 5 times of that of the porous filter membrane 2. Or even preferably, the maximum pore diameter of the restricting orifice 3 is chosen to be equal to or greater than 10 times of that of the porous filter membrane 2. The definitive relation between the pore diameters of the restricting orifice and the porous filter membrane 2 solves the problem that the restricting orifice is easy to be blocked.

The larger the difference between the water seepage capabilities of the flow restrictor 3 and the porous filter membrane 2 is, the slower the water seepage rate of the porous filter membrane 2 is, the smaller the "impact speed" of the impurity is, and the longer the service life of the porous filter membrane 2. Thus, in order to manufacture an infiltration irrigation apparatus of an ultra-long service life, works of the following two aspects shall be done after the pore diameter of the porous filter membrane 2 has been determined: on one hand, the water outflow of the flow restrictor 3 is decreased so far as possible on the condition that the water amount needed by the plants is satisfied, by reducing the number of the restricting orifices or the pore diameter thereof (not less than that of the porous filter membrane); on the other hand, water seepage capability of the porous filter membrane 2 is enhanced so far as possible by increasing the seepage area. Thus, an infiltration irrigation apparatus can be manufactured to work in long term using any water.

The embodiments of the infiltration irrigation apparatus of the present invention are described as follows with reference to the drawings, so as to further describe the infiltration irrigation apparatus and the method for manufacturing the same. To be noted, all the drawings are just illustrative and not drafted in scales. In the drawings, the same reference signs are used to denote the same or similar components.

Embodiment 1

FIGS. 1 to 8 illustrate the structural diagrams of the infiltration irrigation apparatus according to Embodiment 1 of the present invention. As illustrated in FIG. 1, the infiltration irrigation apparatus according to the embodiment includes a water passing chamber 1, a porous filter membrane 2 and a flow restrictor 3. The water passing chamber 1 has a water inlet 11 and a water outlet 12. The porous filter membrane 2 covers a complete circumference of inner wall of the water passing chamber 1. The edges of both ends of the porous filter membrane 2 may closely engage with the inner wall of the water passing chamber 1 and then become waterproof, so as to form a filtration section 20 between the porous filter membrane 2 and the inner wall of the water passing chamber 1 covered thereby. The flow restrictor 3 is disposed on a sidewall of the water passing chamber 1 corresponding to the porous filter membrane 2. Each flow restrictor 3 has one or more restricting orifices, an inlet communicated with the filtration section 20 of the porous filter membrane 2 and an outlet outside the water passing chamber 1. The total water seepage capability of the flow restrictor 3 is smaller than that of the porous filter membrane 2.

Thus as illustrated in FIGS. 1 to 8, since the porous filter membrane 2 covers the complete circumference of inner wall of the water passing chamber 1, when an infiltration irrigation for plants is carried out, the water in the water passing chamber 1 will be filtered by the porous filter membrane 2, enter the filtration section 20 between the porous filter membrane 2 and the inner wall of the water passing chamber 1, and flow out through the restricting orifice of the flow restrictor 3, so as to form irrigation water for irrigating plants. Since the total water seepage capability of the flow restrictor 3 is smaller than that of the porous filter membrane 2, i.e., the total water outflow amount of the flow restrictor 3 is smaller than that of the porous filter membrane 2, the water penetrating the porous filter membrane 2 flows very slowly. After the infiltration irrigation apparatus is used for some time, the impurities in water will only be slightly attached to the porous filter membrane 2. In that case, by making water in the water passing chamber 1 flow axially, the axial water stream passing by the water passing chamber 1 will flow along the surface of the porous filter membrane 2, so as to wash impurities on the porous filter membrane 2, and effectively prevents the porous filter membrane 2 from being blocked.

In this embodiment, the maximum pore diameter of the restricting orifice of the flow restrictor 3 is preferably larger than that of the porous filter membrane 2. Thus, the restricting orifice of the flow restrictor 3 will not be blocked during the infiltration irrigation since the maximum pore diameter of the restricting orifice of the flow restrictor 3 is larger than that of the porous filter membrane 2.

In this embodiment, the porous filter membrane 2 may be directly disposed on the inner wall of the water passing chamber 1 by welding or compression joint, so that the water stream flows on the porous filter membrane 2 and the wash effect is the optimum.

As illustrated in FIGS. 1 and 3, the flow restrictor 3 may be composed of one or more restricting orifices. The flow restrictor 3 may be directly opened on the pipe wall in the range covered by the porous filter membrane 2, or the restricting orifice may be extended outside the infiltration irrigation apparatus by appropriately extending the flow restrictor 3. As illustrated in FIG. 1, in this embodiment, the sidewall of the water passing chamber 1 may be disposed with an opening for engaging with the flow restrictor 3. The flow restrictor 3 may be directly mounted in the opening to dispose the flow restrictor 3 on the sidewall of the tubular water passing chamber 1. The mounting of the flow restrictor 3 in the opening of the water passing chamber 1 may be specifically as follows: the flow restrictor 3 is made of porous ceramics and inserted into the opening with its outer wall closely engaging with the opening edge; or the flow restrictor 3 is made of several hydrophilic fibers directly disposed in the opening with their ends extending outside, so as to form a mounting structure for the flow restrictor 3 and the opening. As illustrated in FIG. 1A, the inlet of the flow restrictor 3 may be closely engaged with the opening to dispose the flow restrictor 3 on the sidewall of the water passing chamber 1.

As illustrated in FIGS. 1 and 2, in this embodiment, each porous filter membrane 2 may be correspondingly disposed with one flow restrictor 3, or as illustrated in FIGS. 3 and 5, each porous filter membrane 2 is corresponding to two or more flow restrictors 3, so as to distribute the irrigation water to different irrigation locations. Under the same pressure and time, the water outflow amounts of the porous filter membrane 2 are measured and the water outflow amounts of the one or more flow restrictors 3 in the range covered by the porous filter membrane 2 are measured, and the total water seepage amount of the one or more flow restrictors 3 shall be smaller than that of the porous filter membrane 2, i.e., the total water seepage capability of the one or more flow restrictors 3 is smaller than that of the porous filter membrane 2. Thus the flow restrictor 3 limits the water seepage rate of the porous filter membrane 2, and reduces the "impact speed" of impurities in the water on the porous filter membrane 2. So the impurities on the surface of the porous filter membrane 2 are easier to be cleared by the water stream, which greatly prolongs the service life of the porous filter membrane.

In this embodiment, as illustrated in FIGS. 1, 4, 5 and 8, the water passing chamber 1 may be constituted by a water pipe 10 or a part thereof. As illustrated in FIG. 4, a plurality of porous filter membranes 2 may be disposed in the axial direction of the water pipe 10 or a part thereof. Or as illustrated in FIG. 5, a whole porous filter membrane 2 is extendedly disposed in the axial direction of the water pipe 10 or a part thereof, and a plurality of flow restrictors 3 are disposed in correspondence to the porous filter membrane 2, so as to irrigate plants at different locations.

As illustrated in FIGS. 7 and 8, the water passing chamber 1 may also be a tubular support enclosed in the water pipe 10. An infiltration irrigation apparatus having such a water passing chamber 1 composed of a tubular support may be manufactured in the following steps:

A. providing one or more flow restrictors 3, one or more porous filter membranes 2, and a water passing chamber 1 composed of a tubular support, wherein each flow restrictor 3 has one or more restricting orifices, and the total water seepage capability of the one or more flow restrictors 3 is smaller than that of the one or more porous filter membranes 2;

B. correspondingly disposing the porous filter membrane 2 and the flow restrictor 3 on the tubular support, wherein the porous filter membrane 2 is located in the pipe of the tubular support; a filtration section 20 for accommodating water filtered by the porous filter membrane 2 is formed; the flow restrictor 3 is mounted on the sidewall of the tubular support in correspondence to the porous filter membrane 2; and an inlet of the flow restrictor 3 is communicated with the filtration section 30 of the porous filter membrane 2;

C. putting the tubular support having the porous filter membrane 2 and the flow restrictor 3 into a molding machine head during an extrusion molding of a water pipe 10, so that the tubular support is wrapped in the water pipe 10 after the water pipe 10 is extruded by the molding machine head; and D. making a cut at a location corresponding to an outlet of flow restrictor 3 on the sidewall of the water pipe 10, so as to expose the outlet of the flow restrictor 3 and form an infiltration irrigation apparatus as illustrated in FIG. 8.

Thus, when water flows in the water pipe, some flows in the axial direction of the water pipe and passes by the surface of the porous filter membrane 2 to wash the surface, while some is filtered by the porous filter membrane 2, enters the flow restrictor 3 through the filtration section 20, and flows out of the outlet of the flow restrictor 3 to form irrigation water.

Upon the irrigation demand, the water pipe 10 or a part thereof may be a main water pipe in the irrigation system, or a plurality of branches connected to the main water pipe, and herein is not limited.

The flow of water stream in the water passing chamber 1 may be implemented in various manners. For example, one end of the water pipe is provided with a valve or micro pump, and the water in the whole pipe will flow when some water is discharged by opening the valve or the water is pumped by the other end of the micro pump upon demand, so as to form an axial water stream in the water passing chamber 1. For a short water passing chamber 1 or water pipe, a pushable piston may be disposed at the location of a water inlet 11. When the porous filter membrane 2 needs to be cleaned, the piston is pushed to make the water in the water passing chamber 1 or the water pipe flow, so as to wash the surface of the porous filter membrane 2.

During the production of such infiltration irrigation apparatus, it is inconvenient to mount the porous filter membrane 2 and the flow restrictor 3 in the narrow tube, and there are many inconveniences in implementation with prior producing methods. The infiltration irrigation apparatus of the present invention may be manufactured by using the following method, in addition to the manner as illustrated in FIGS. 7 and 8 in which a tubular support having the porous filter membrane 2 and the flow restrictor 3 is firstly formed and then put into the water pipe:

A. molding a flow restrictor 3 having one or more restricting orifices;

B. engaging one or more flow restrictors 3 with a plastic sheet 13 having first and second longitudinal edges 131, 132, as illustrated in FIG. 6;

C. providing a porous filter membrane 2 such that the total water seepage capability of the one or more flow restrictors 3 is smaller than that of the porous filter membrane 2;

D. making one or more porous filter membranes 2 to at least cover an inner wall of the plastic sheet 13 corresponding to the flow restrictor 3, so as to form the filtration section between the porous filter membrane 2 and the inner wall covered thereby, as illustrated in FIG. 6; and E. engaging the first longitudinal edge of the plastic sheet 10 with the second longitudinal edge of the plastic sheet 10 to form a tubular shape, as illustrated in FIG. 6.

The steps C and D may be performed before the steps A and B, i.e., the porous filter membrane 2 may be connected to the plastic sheet 13 firstly, then the flow restrictor 3 is engaged with the plastic sheet 13, and limitation is not made in the present application. Furthermore, in step A, the flow restrictor 3 may be an independent product, or directly formed by molding the porous medium or capillary tubes at the opening of the plastic sheet 10, and herein is not limited.

Thus in this embodiment, the porous filter membrane 2 and the flow restrictor 3 may be directly engaged with the plastic sheet 13 at first in the production, and then the first and second longitudinal edges 131 and 132 of the plastic sheet are engaged (by hot melting or gluing) with each other to form the plastic sheet 13 into a tubular shape, so as to facilitate the continuous production of the tubular infiltration irrigation apparatus.

Embodiment 2

FIGS. 9 to 13 illustrate structural diagrams of Embodiment 2 of the present invention. The basic structure of this embodiment is substantially the same as that of Embodiment 1, the descriptions of the same portions are omitted herein, and the difference is the manner of disposing the porous filter membrane 2. In this embodiment, provided that the total water seepage capability of the porous filter membrane 2 is larger than that of the flow restrictor 3, the porous filter membrane 2 may be just disposed on a part of the circumference of the inner wall of the water pipe 1, i.e., it only covers a part of the inner circumferential wall of the water passing chamber 1 corresponding to the flow restrictor 3. In addition, the edges of the porous filter membrane 3 closely engage with the inner of the water pipe to proof water, so as to form an isolated filtration section 20 between the porous filter membrane 2 and the inner wall of the water pipe covered thereby. The water cannot become irrigation water until it enters the filtration section 20 through the porous filter membrane 2 and flows out through the flow restrictor. The water stream in the water pipe functions to clear impurities when passing by the surface of the porous filter membrane 2.

In this embodiment, as illustrated in FIG. 9, each porous filter membrane 2 may be correspondingly disposed with a flow restrictor 3. Or as illustrated in FIGS. 11 and 12, each porous filter membrane 2 may be corresponding to two or more flow restrictors 3, so as to distribute the irrigation water to different irrigation locations.

In this embodiment, as illustrated in FIGS. 9, 11 and 12, the water passing chamber 1 may be constituted by a water pipe 10 or a part thereof. As illustrated in FIG. 11, a plurality of porous filter membranes 2 may be disposed in the axial direction of the water pipe 10 or a part thereof. Or as illustrated in FIG. 12, a whole porous filter membrane 2 is extendedly disposed in the axial direction of the water pipe 10 or a part thereof, and a plurality of flow restrictors 3 are disposed in correspondence to the porous filter membrane 2, so as to irrigate plants at different locations. Upon the irrigation demand, the water pipe 10 or a part thereof may be a main water pipe in the irrigation system, or a plurality of branches connected to the main water pipe, and herein is not limited.

In this embodiment, being similar to illustrations of FIGS. 7 and 8 in Embodiment 1, the water passing chamber 1 may be a tubular support enclosed in the water pipe 10 (not shown). The manufacturing method thereof can also be the same as that in Embodiment 1, and herein is omitted.

In this embodiment, the flow of water stream in the water passing chamber 1 may also be implemented in various manners. For example, one end of the water pipe is provided with a valve or micro pump, and the water in the whole pipe will flow when some water is discharged by opening the valve or the water is pumped by the other end of the micro pump upon demand, so as to form an axial water stream in the water passing chamber 1. For a short water passing chamber 1 or water pipe, a pushable piston may be disposed at the location of a water inlet 11. When the porous filter membrane 2 needs to be cleaned, the piston is pushed to make water in the water passing chamber 1 or the water pipe flow, so as to wash the surface of the porous filter membrane 2.

During the production of such infiltration irrigation apparatus, it is inconvenient to mount the porous filter membrane 2 and the flow restrictor 3 in the narrow tube, and there are many inconveniences in implementation with the prior producing methods. Being similar to Embodiment 1, in addition to the manner as illustrated in FIGS. 7 and 8 in which a tubular support having the porous filter membrane 2 and the flow restrictor 3 is firstly formed and then put into the water pipe, the following method may be adopted: as illustrated in FIG. 13, the porous filter membrane 2 and the flow restrictor 3 may be firstly disposed on the plastic sheet 13 having the first and second longitudinal edges 131 and 132, and then the first and second longitudinal edges 131 and 132 of the plastic sheet 13 are engaged (by hot melting or gluing) with each other to form the plastic sheet 13 into a tubular shape, so as to facilitate the continuous production of the tubular infiltration irrigation apparatus.

Since the embodiment has a structure substantially the same as that of Embodiment 1, the technical effect of Embodiment 1 will also be achieved, and herein is omitted.

Embodiment 3

FIGS. 14 to 19 illustrate structural diagrams of Embodiment 3 of the present invention. The basic structure and the principle of this embodiment are substantially the same as that of Embodiment 1, and the descriptions of the same portions are omitted herein. As illustrated in FIGS. 14 to 19, this embodiment differs from Embodiment 1 in that the porous filter membrane 2 is bag-shaped, and the filtration section 20 is formed in a bag of the porous filter membrane 2. During the infiltration irrigation, the water cannot become irrigation water until it enters the bag through the bag-shaped porous filter membrane 2 (i.e., into the filtration section 20), and flows out of the tubular infiltration irrigation apparatus through the flow restrictor 3.

In addition to the effect of Embodiment 1, since a bag-shaped porous filter membrane 2 is used, a blockage is more difficult to be caused. Because firstly, as compared with the flush porous filter membrane, the bag-shaped porous filter membrane 2 can multiply the membrane area in a narrow space, reduce the adhesive force of impurities, and prolong the membrane life. Secondly, once water flows in the pipe, a pressure will be produced in a part of region of the bag of the porous filter membrane 2; such pressure is transferred to the water in the bag and causes a liquid pressure outward from the inside of the bag; and some water flows outwards from the inside of the bag through the pores on the membrane, so as to produce a certain effect of backwash and prolong the membrane life.

As illustrated in FIGS. 14A and 14B, in this embodiment, the porous filter membrane 2 and the flow restrictor 3 may be disposed on the water passing chamber 1 in a manner similar to that of Embodiment 1. The bag mouth edges of the porous filter membrane 2 closely engage with the inner wall of the water passing chamber 1, an opening for engaging with the flow restrictor 3 is disposed at a location on the sidewall of the water passing chamber 1 corresponding to the bag mouth of the porous filter membrane 2, and the inlet of the flow restrictor 3 may directly and closely engage with the opening on the sidewall of the water passing chamber 1 as illustrated in FIG. 14A, or as illustrated in FIG. 14B, the flow restrictor 3 is mounted in the opening with its outer wall engaging with the opening edges. As illustrated in FIG. 14, in this embodiment, the bag mouth of the porous filter membrane 2 may be fixedly and closely engaged with the inlet edge of the flow restrictor 3 at first, so that the inlet of the flow restrictor 3 is communicated with the filtration section 20; and then the flow restrictor 3 having a membrane bag is fixed by plugging from inside to outside and sealed at the opening of the water passing chamber 1. This mounting manner is simple and convenient, in which the flow restrictor 3 may have an inverted cone shape so as to be conveniently plugged at the opening of the water passing chamber 1. Further as illustrated in FIG. 19, the upper portion of the flow restrictor 3 may have a neck. During the mounting, the bag mouth of the membrane bag is fixedly and closely engaged with the opening of the water passing chamber 1, then the flow restrictor 3 is inserted into the opening from outside the water passing chamber 1, and the neck of the flow restrictor 3 is clamped and fixed at the opening, finally is sealed. Preferably, the opening of the water passing chamber 1 is made of a material (e.g., rubber) of a good elasticity for the convenience of mounting and ensuring the sealing effect.

In this embodiment, the porous filter membrane 2 is preferably in a flat bag shape, and the flat bag-shaped porous filter membrane 2 is set flush in the water passing chamber 1, which can effectively increase the area of the porous filter membrane 2, and will not cause too large a resistance to the water stream in the pipe.

In this embodiment, each porous filter membrane 2 may be provided with a flow restrictor 3 as illustrated in FIG. 14; or as illustrated in FIG. 16, each porous filter membrane 2 is corresponding to two or more flow restrictors 3, so as to distribute the irrigation water to different irrigation locations.

In this embodiment, as illustrated in FIGS. 14, 17 and 18, the water passing chamber 1 may be constituted by a water pipe 10 or a part thereof. As illustrated in FIGS. 17 and 18, a plurality of porous filter membranes 2 may be disposed along the axial direction of the water pipe 10 or a part thereof. Upon the irrigation demand, the water pipe 10 or a part thereof may be a main water pipe in the irrigation system, or a plurality of branches connected to the main water pipe, and herein is not limited.

In this embodiment, as illustrated in FIG. 18, the water passing chamber 1 may be a tubular support enclosed in the water pipe 10 similar to that as illustrated in FIGS. 7 and 8 of Embodiment 1. The manufacturing method thereof may be the same as that of Embodiment 1, and herein is omitted.

In this embodiment, the flow of water stream in the water passing chamber 1 may be implemented in various manners. For example, one end of the water pipe is provided with a valve or micro pump, and the water in the whole pipe will flow when some water is discharged by opening the valve or the water is pumped by the other end of the micro pump upon demand, so as to form an axial water stream in the water passing chamber 1. For a short water passing chamber 1 or water pipe, a pushable piston may be disposed at the location of a water inlet 11. When the porous filter membrane 2 needs to be cleaned, the piston is pushed to make water in the water passing chamber 1 or the water pipe flow, so as to wash the surface of the porous filter membrane 2.

During the production of such infiltration irrigation apparatus, it is inconvenient to mount the porous filter membrane 2 and the flow restrictor 3 in the narrow tube, and there are many inconveniences in implementation with the prior producing methods. Being similar to Embodiment 1, in addition to the manner as illustrated in FIGS. 7 and 8 in which a tubular support having the porous filter membrane 2 and the flow restrictor 3 is firstly formed and then put into the water pipe, the following method may be adopted: as illustrated in FIG. 20, the porous filter membrane 2 and the flow restrictor 3 may be firstly disposed on the plastic sheet 13 having the first and second longitudinal edges 131 and 132, and then the first and second longitudinal edges 131 and 132 of the plastic sheet 13 are engaged (by hot melting or gluing) with each other to form the plastic sheet 13 into a tubular shape, so as to facilitate the continuous production of the tubular infiltration irrigation apparatus.

Since the embodiment has a structure substantially the same as Embodiment 1, the technical effect of Embodiment 1 will also be achieved, and herein is omitted.

Embodiment 4

FIGS. 21 to 25 illustrate structural diagrams of Embodiment 4 of the present invention. The basic structure and the principle of this embodiment are substantially the same as the preceding embodiments, and the descriptions of the same portions are omitted herein. In which as illustrated in FIGS. 21 to 25, this embodiment differs from the preceding embodiments as follows: in preceding Embodiments 1 to 3, the porous filter membrane 2 and the flow restrictor 3 are not integrally formed and may be formed of different materials, e.g., the porous filter membrane 2 is made of nylon membrane, and the flow restrictor 3 is made of hydrophilic fibers or porous material; while in this embodiment, the porous filter membrane 2 and the flow restrictor 3 are formed integrally with the same porous material (e.g., porous ceramics), i.e., the upper portion of the flow restrictor 3 becomes the porous filter membrane 2 of a large area so that the porous filter membrane 2 itself forms a filtration section 20 isolated from the water passing chamber 1, and the bottom of the porous filter membrane 2 extrudes integrally to form the flow restrictor 3. In addition, the thickness and area of the porous filter membrane 2 may be set according to the filtration demands.

In this embodiment, the total water seepage capability of the porous filter membrane 2 may be larger than that of one or more flow restrictors 3 by setting the water seepage surface of the porous filter membrane 2 to be larger than the total water outflow area of the one or more flow restrictors 3, so as to restrict the flow rate of the water penetrating the porous filter membrane 2.

The integral structure of the porous filter membrane 2 and the flow restrictor 3 has a small water outflow area outside the water passing chamber 1, while a far larger volume and a quite larger surface inside the water passing chamber 1. Thus the water outlet at the outside actually functions to restrict the water stream, and the water penetration rate on the large surface inside is very slow. The "impact speed" of impurities is slower correspondingly, which is very beneficial for clearing the impurities. The porous filter membrane 2 and the flow restrictor 3 made of an integral material are easier for manufacturing and mounting, and have a reduced cost.

In this embodiment, an opening may be pre-disposed on the water passing chamber 1, and the water outlet of the flow restrictor 3 may be inserted from the inside to the outside through the opening and then fixed and sealed. Alternatively, the flow restrictor 3 may be screwed on the sidewall of the water passing chamber 1 by its housing.

As illustrated in FIG. 25, the method for manufacturing the infiltration irrigation apparatus is easier than that of Embodiment 1. It only needs to molding the porous filter membrane 2 and the flow restrictor 3 integrally formed with a same material (e.g., porous ceramics), and then engaging them with the plastic sheet. It can refer to Embodiment 1 for other portions.

In this embodiment, as illustrated in FIG. 24, the water passing chamber 1 may also be a tubular support enclosed in the water pipe 10. The manufacturing method thereof may be the same as that of Embodiment 1, and herein is omitted.

Although the embodiments disclose the present invention, they do not intend to limit the present invention. Any replacement of equivalent assembly made by a person skilled in the art without deviating from the concept and scope of the present invention, or any equivalent change and modification made according to the patent protection scope of the present invention, shall be covered by the present patent application.

What is claimed is:

1. An infiltration irrigation apparatus, comprising:
    a water passing chamber having a water outlet and a water inlet, wherein a water stream along an axial direction of the water passing chamber is formed when water flows between the water inlet and the water outlet;
    one or more porous filter membranes disposed in the water passing chamber and formed with a filtration section for accommodating the water filtered by the one or more porous filter membranes, wherein the location of the one or more porous filter membranes is set so that at least a part of the water stream flows along a surface of the porous filter membrane to wash the surface when the axial water stream exists in the water passing chamber; and
    one or more flow restrictors each disposed on a sidewall of the water passing chamber corresponding to the porous filter membrane, wherein each of the one or more flow restrictors has one or more restricting orifices, an inlet communicated with the filtration section of the one or more porous filter membranes and an outlet outside the water passing chamber, a maximum pore diameter of the restricting orifice of the flow restrictor is larger than that of the porous filter membrane and a total water seepage capability of the one or more flow restrictors is smaller than that of the one or more porous filter membranes.

2. The infiltration irrigation apparatus according to claim 1, wherein the number of the one or more porous filter membranes is one, and one or more flow restrictors are disposed in correspondence to the porous filter membrane.

3. The infiltration irrigation apparatus according to claim 1, wherein the number of the one or more porous filter membranes is more than one, and one or more flow restrictors are disposed in correspondence to each of the porous filter membranes.

4. The infiltration irrigation apparatus according to claim 1, wherein the porous filter membrane covers a part of an inner wall of the water passing chamber, and edges of the porous filter membrane closely engage with the inner wall of the water passing chamber, so as to form the filtration section between the porous filter membrane and the inner wall of the water passing chamber covered thereby.

5. The infiltration irrigation apparatus according to claim 1, wherein the porous filter membrane covers a complete circumference of an inner wall of the water passing chamber, and edges of the porous filter membrane closely engage with the inner wall of the water passing chamber, so as to form the filtration section between the porous filter membrane and the inner wall of the water passing chamber covered thereby.

6. The infiltration irrigation apparatus according to claim 1, wherein the porous filter membrane is bag-shaped, and the filtration section is formed in a bag of the porous filter membrane.

7. The infiltration irrigation apparatus according to claim 6, wherein the sidewall of the water passing chamber is disposed with an opening for engaging with the flow restrictor, the flow restrictor is inserted into the opening, a housing of the flow restrictor closely engages with edges of the opening, a bag mouth of the bag-shaped porous filter membrane closely engages with the inlet of the flow restrictor, so that the inlet of the flow restrictor is communicated with the filtration section.

8. The infiltration irrigation apparatus according to claim 6, wherein the porous filter membrane has a flat bag shape, and the flat bag shaped porous filter membrane is set flush in the water passing chamber.

9. The infiltration irrigation apparatus according to claim 1, wherein the sidewall of the water passing chamber is disposed with an opening for engaging with the flow restrictor, the inlet of the flow restrictor closely engages with the opening, so as to dispose the flow restrictor on the sidewall of the water passing chamber.

10. The infiltration irrigation apparatus according to claim 1, wherein the sidewall of the water passing chamber is disposed with an opening for engaging with the flow restrictor, the flow restrictor is directly mounted in the opening, so as to dispose the flow restrictor on the sidewall of the water passing chamber.

11. The infiltration irrigation apparatus according to claim 1, wherein the water passing chamber is formed in a tubular shape.

12. The infiltration irrigation apparatus according to claim 1, wherein the water passing chamber is constituted by a water pipe or a part thereof, or a tubular support enclosed in the water pipe, and when the water flows in the water pipe, some flows in an axial direction of the water pipe and passes by a surface of the porous filter membrane to wash the surface, while some is filtered by the porous filter membrane, enters the flow restrictor through the filtration section, and flows out of the outlet of the flow restrictor to form irrigation water.

13. The infiltration irrigation apparatus according to claim 12, wherein the number of the porous filter membranes is more than one, each of the porous filter membranes is disposed in a tubular support, and a plurality of tubular supports disposed with the porous filter membranes are enclosed in the water pipe, respectively, in the axial direction of the water pipe, so that the porous filter membranes are distributed in the water pipe.

14. The infiltration irrigation apparatus according to claim 12, wherein the water pipe is disposed with a valve or mounted with a micro pump actuated periodically, so that the water in the pipe moves to clear the impurities on the surface of the porous filter membrane.

15. The infiltration irrigation apparatus according to claim 1, wherein the total water seepage capability of the porous filter membrane is equal to or greater than five times of that of the corresponding one or more flow restrictors.

16. The infiltration irrigation apparatus according to claim 1, wherein the maximum pore diameter of the restricting orifice is equal to or greater than five times of that of the porous filter membrane.

17. An infiltration irrigation apparatus, comprising:
a water passing chamber having a water outlet and a water inlet, wherein a water stream along an axial direction of the water passing chamber is formed in the water passing chamber when water flows between the water inlet and the water outlet;
one or more porous filter membranes disposed in the water passing chamber and formed with a filtration section for accommodating the water filtered by the one or more porous filter membranes; wherein the location of the one or more porous filter membranes is disposed so that at least a part of the water stream flows along the surface of the porous filter membrane to wash the surface when the axial water stream exists in the water passing chamber, and
one or more flow restrictors each disposed on a sidewall of the water passing chamber corresponding to the porous filter membrane, wherein each of the one or more flow restrictors has one or more restricting orifices, an inlet communicated with the filtration section of the one or more porous filter membranes and an outlet outside the water passing chamber, a maximum pore diameter of the restricting orifice restrictor is larger than that of the porous filter membrane and the total water seepage capability of the one or more flow restrictors is smaller than that of the one or more porous filter membranes; and the porous filter membrane and the flow restrictor are integrally formed with a same porous material.

18. The infiltration irrigation apparatus according to claim 17, wherein the porous material is porous ceramics.

* * * * *